Patented Dec. 14, 1943

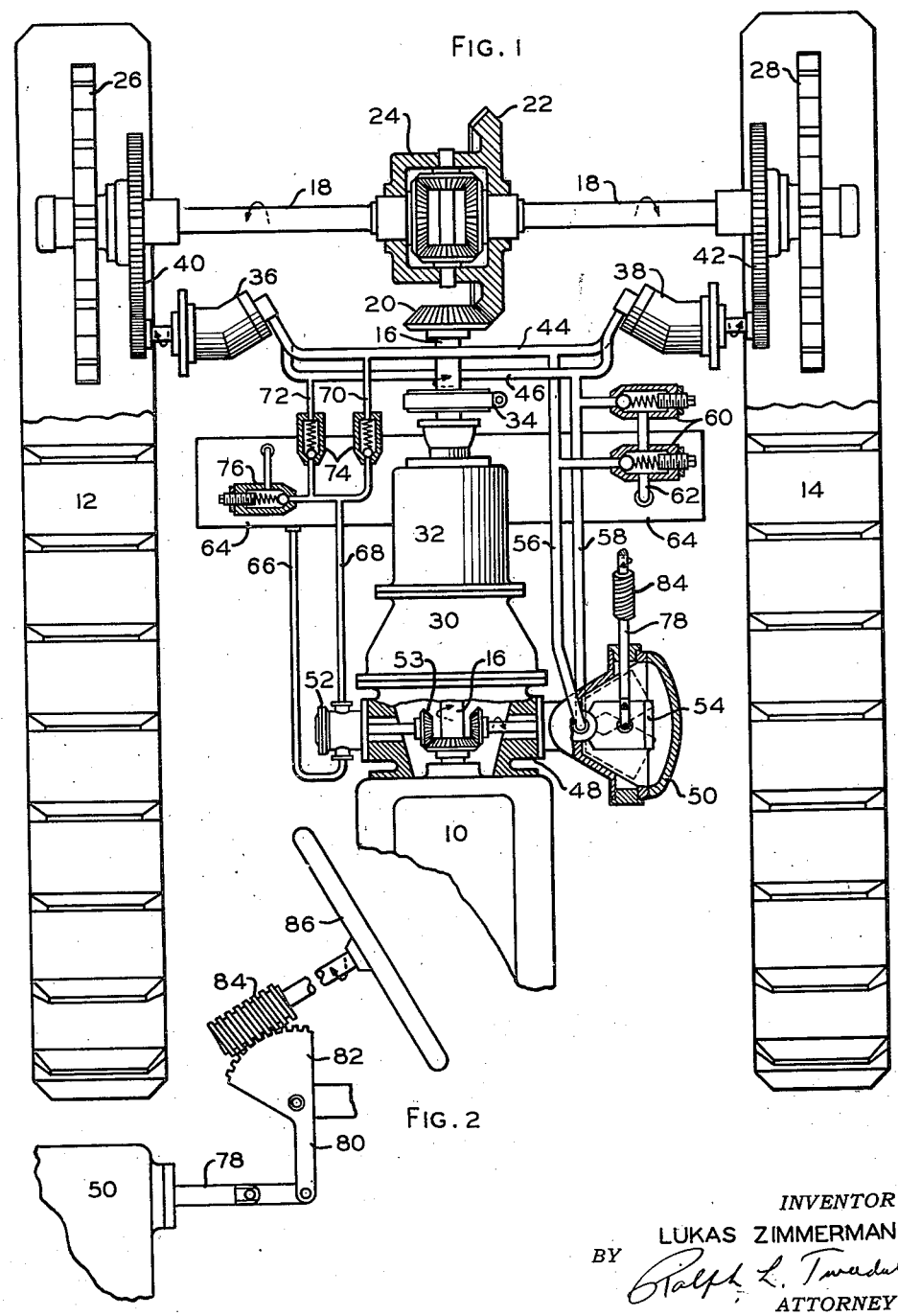

2,336,911

UNITED STATES PATENT OFFICE 2,336,911

POWER TRANSMISSION AND STEERING CONTROL FOR TRACTION DEVICES

Lukas Zimmermann, Detroit, Mich., assignor to Vickers Incorporated, Detroit, Mich., a corporation of Michigan Application September 5, 1941, Serial No. 409,671

3 Claims. (Cl. 180—9.2)

This invention relates to power transmissions, particularly to those of the type comprising two or more fluid pressure energy translating devices, one of which may function as a pump and another as a fluid motor.

The invention is more particularly concerned with a power transmission system adapted for driving a vehicle, for example, of the endless tread type, and wherein steering is accomplished by varying the relative velocity of the treads as between the two sides of the vehicle. Vehicles of this class, as previously constructed, have employed independent clutching or braking mechanism for each side of the vehicle arranged to be selectively engaged or disengaged by means of a suitable steering control mechanism at the will of the operator. Such clutch and brake mechanism are frequently difficult to keep in adjustment, are subject to continual wear, are wasteful of driving energy, and, in most instances, fail to provide precisely graduated control of the relative velocities of the two driving treads.

It is an object of the present invention to provide an improved power transmission system for vehicles of this class in which friction clutches and brakes are eliminated from the steering mechanism and in which positive and precisely graduated control of the relative tread velocities may be maintained at all times.

A further object is to provide in a vehicle of this class a drive control mechanism incorporating hydraulic power transmission mechanism arranged as a supplementary control over a conventional mechanical geared drive through which the engine power is normally transmitted to the treads.

Further objects and advantages of the present invention will be apparent from the following description, reference being had to the accompanying drawing wherein a preferred form of the present invention is clearly shown.

In the drawing:

Figure 1 is a diagrammatic plan view of a tractor drive and steering system incorporating a preferred form of the present invention.

Figure 2 is a fragmentary view showing a manual control means for the mechanism of Figure 1.

There is indicated at 10 an internal combustion engine for driving two endless tractor treads 12 and 14. The engine 10 has a drive shaft 16 geared to a differential axle 18 through a pinion 20 and a ring gear 22. The latter is formed on the frame member of a differential gear unit 24 in axle 18. Two drive wheels 26 and 28, one on each end of axle 18, drivingly engage treads 12 and 14, respectively. A clutch 30 and transmission 32 are provided for selective application of power to the axle 18. Drive shaft 16 is equipped with a brake 34.

Two identical fixed displacement fluid pressure energy translating devices 36 and 38 are connected by gearing 40 and 42, respectively, to axle 18 on either side of differential 24. The devices 36 and 38 may function either as pumps or motors and will hereafter be referred to as units. The two ports of unit 36 are connected to the two ports of unit 38 by a pair of conduits 44 and 46.

A housing member 48, intermediate engine 10 and clutch 30, has mounted thereon a main pump 50 and an auxiliary pump 52. The two pumps are driven by engine 10 through shaft 16 and bevel gearing 53 in housing 48. Pump 50 is of the variable displacement reversible delivery type having a swinging yoke 54 which is shown in its neutral or zero displacement position. Such pumps are of several well-known general types, the one illustrated being of the type shown in Thoma Patent No. 1,931,969. The two ports of pump 50 are connected by a pair of conduits 56 and 58 to the conduits 44 and 46, respectively. Conduits 56 and 58 are each provided with a relief valve 60. If a predetermined maximum pressure is exceeded in either conduit, pressure fluid will be relieved through its respective relief valve 60 and passed by a conduit 62 to an oil reservoir 64.

The auxiliary pump 52, which may be of a small fixed displacement type, has a suction conduit 66, for drawing oil from the reservoir 64, and a delivery conduit 68. The latter has two branch conduits 70 and 72, each containing a check valve 74, connecting into conduits 44 and 46, respectively, for supplying oil to the low pressure side of the main hydraulic circuit to make up for losses due to leakage and the possible opening of relief valves 60. The conduit 68 is provided with a relief valve 76 similar to valves 60, but set for a much lower maximum pressure.

Steering of the tractor is effected by the operation of units 36 and 38 as controlled by the stroke regulation of pump 50. The shifting of yoke 54 in pump 50 is under control of the tractor operator through any suitable stroke regulating means such as that shown in Figure 2. A stroke regulating rod 78 is linked at one end to the yoke 54 and at the other end to a lever extension 80 of a gear sector 82. The sector 82 is engaged by a worm 84 on the shaft of a steering wheel 86.

In operation, with the yoke 54 of pump 50 in neutral position and the engine 10 running, driving power will be transmitted through shaft 16, clutch 30, transmission 32, pinion 20 and ring gear 22 of differential 24 to axle 18. Wheels 26 and 28 will accordingly drive treads 12 and 14 causing the tractor to move. Axle 18 will also drive the two units 36 and 38 as pumps through gearing 40 and 42, respectively.

The shaft 16, axle 18, and units 36 and 38 are now rotating in a direction as indicated by the arrows.

Unit 36 discharges oil through conduit 44 to the suction port of unit 38 which in turn discharges the oil through conduit 46 to the suction port of unit 36. As both units 36 and 38 are of the same displacement and are being driven as pumps at the same speed, each fills the capacity requirements of the other. Thus, it will be seen that oil will be freely circulated between units 36 and 38 with no pressure drop across either unit. If, however, the tread 12, for example, should meet greater resistance than tread 14, unit 36 would be unable to pass the delivery of unit 38 freely. Under these conditions, pressure in conduit 46 will rise and unit 38 acting as a pump will drive unit 36 as a motor supplying the added torque required for tread 12.

As the pump 50 is in neutral, there is no flow therethrough or in conduits 56 and 58.

In order to steer the tractor to one side or the other, the operator turns wheel 86 in the usual manner. This action turns worm 84 and through sector 82 and lever 80 will shift rod 78 to move yoke 54 off center. If the wheel 86 and worm 84 are turned in the direction indicated by arrows, the yoke will move toward its lowermost position as shown in dotted lines.

The pump 50 will then withdraw oil from conduit 58 and discharge the same into conduit 44 through conduit 56. The delivery of pump 50 joining that of unit 36 in conduit 44 will exceed the intake capacity of unit 38 as a pump if the speed of the two units remained the same. Accordingly, pressure in conduit 44 will rise considerably. At the same time pressure is conduit 46 will drop as unit 36 and pump 50 are drawing oil therefrom with only unit 38 discharging thereto. This pressure drop across unit 38 will tend to drive it as a motor in the same direction as it is being driven from axle 18 through gearing 42 but at a faster speed. The unit 36, however, will tend to slow down because of the high back pressure in its discharge conduit 44.

Thus, it will be seen that the unit 38 tends to drive the tread 14 in the same direction as it is being driven by engine 10 but at a faster speed while unit 36 tends to brake tread 12 against the drive of the engine.

To turn the tractor in the other direction, the wheel 86 and worm 84 are turned in the direction opposite to that indicated by the arrows. This reverses pump 50 by shifting yoke 54 toward its uppermost position as shown in dotted lines. The functions of units 36 and 38 are reversed with the former tending to drive tread 12 and the latter braking tread 14.

It will be seen that during straightforward travel of the vehicle the driving torque is substantially entirely transmitted through the mechanical gearing to the treads. Under these circumstances, the hydraulic units 36 and 38 act merely as torque balancers, so to speak, and transmit only the difference between the torque required to drive one tread and that required to drive the other. In so doing they act as a positive synchronizing means for the differential axle and insure that the speeds of the two treads are maintained equal.

When the variable pump 50 is shifted out of neutral position for steering purposes, the units 36 and 38 are still not required to transmit the full driving torque of the engine but here again transmit only the relative difference in torque requirement between the two sides of the machine. In this way, the hydraulic units required are not as large and as expensive as if the full driving torque had to be transmitted through them.

Since the oil used in the hydraulic units is substantially incompressible, a positive control of relative tread speed is accomplished. Thus, neglecting leakage losses which are of a minor nature anyway, all of the oil which goes into unit 36 from pipe 46 must be supplied by unit 38 when the pump 50 is in neutral. With the pump 50 on stroke delivering into pipe 56, the combined outputs of unit 38 and pump 50 must pass through the unit 36, and this can only occur either by an increase in speed of unit 36 or a decrease in speed of unit 38. Thus, considering the action of the devices on a volumetric basis alone, the inherent positiveness of the control is readily apparent.

While the form of embodiment of the invention as herein disclosed constitutes a preferred form, it is to be understood that other forms might be adopted, all coming within the scope of the claims which follow.

What is claimed is as follows:

1. In a motor vehicle of the type having traction devices at opposite sides thereof in which turning is initiated by changing the relative velocity of the traction devices, the combination with the usual differential gearing drive mechanism for the traction devices of a three-unit, positive displacement, hydraulic transmission system comprising two units, one connected with each traction device, and a third unit driven by the vehicle prime mover and hydraulically connected in parallel with the other units, at least one of said units being of the variable displacement type, said hydraulic system acting as a supervisory positive control over the relative velocities of the two traction devices when they are supplied with a major portion of their required driving power through said gear drive mechanism.

2. In a motor vehicle of the type having traction devices at opposite sides thereof in which turning is initiated by changing the relative velocity of the traction devices, the combination with the usual differential gearing drive mechanism for the traction devices of a three-unit, positive displacement, hydraulic transmission system comprising two units, one connected with each traction device and arranged to have equal and opposite fluid displacements when both traction devices are operating at the same speed, and a third unit driven by the vehicle prime mover and hydraulically connected in parallel with the other units, said third unit being of the variable displacement type, said hydraulic system acting as a supervisory positive control over the relative velocities of the two traction devices when they are supplied with a major portion of their required driving power through said gear drive mechanism.

3. In a motor vehicle of the type having traction devices at opposite sides thereof in which turning is initiated by changing the relative velocity of the traction devices, the combination with the usual differential gearing drive mechanism for the traction devices of a positive displacement, hydraulic transmission system comprising fluid pressure energy translating mechanism connected between said traction devices to produce a net volumetric displacement of zero when said traction devices rotate at equal speeds, and a power-driven, reversible, variable displacement pump hydraulically connected to said mechanism to receive and deliver fluid in either direction from and to said mechanism to thereby positively control the relative velocities of said traction devices.

LUKAS ZIMMERMANN.